(12) United States Patent  
Smith et al.

(10) Patent No.: US 7,528,832 B2  
(45) Date of Patent: May 5, 2009

(54) METHOD, APPARATUS AND COMPUTER PROGRAM PRODUCT ENABLING A DYNAMIC GLOBAL PARAMETERIZATION OF TRIANGLE MESHES OVER POLYGONAL DOMAIN MESHES

(75) Inventors: Jordan Philip Smith, White Plains, NY (US); Ioana M. Boier-Martin, Pelham Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 11/872,759

(22) Filed: Oct. 16, 2007

(65) Prior Publication Data  
US 2008/0036760 A1    Feb. 14, 2008

Related U.S. Application Data

(63) Continuation of application No. 11/044,359, filed on Jan. 26, 2005, now Pat. No. 7,310,097.

(51) Int. Cl.  
*G06T 17/00* (2006.01)

(52) U.S. Cl. .................................................. 345/423

(58) Field of Classification Search .................. None  
See application file for complete search history.

(56) References Cited

U.S. PATENT DOCUMENTS 6,831,638 B2    12/2004   Praun et al. ................. 345/419

7,113,184 B2    9/2006    Fossum et al. .............. 345/419  
2005/0151733 A1    7/2005    Sander et al. ............... 345/423

OTHER PUBLICATIONS

Guibas, L.J., et al., "Primitives for the Manipulation of General Subdivisions and the Computation of Voronoi Diagrams", 1985, Xerox PARC and Stanford University, pp. 221-234.  
Hoppe, H., et al., "Mesh Optimization", 1993, University of Washington, pp. 19-25.  
Hoppe, H., "Progressive Meshes", Microsoft Research, 1996, 10 pgs.

(Continued)

*Primary Examiner*—Kee M Tung  
*Assistant Examiner*—Andrew Yang  
(74) *Attorney, Agent, or Firm*—Harrington & Smith, PC

(57) ABSTRACT

A method, a data storage medium storing a computer program, and a data processing system are disclosed to process data comprised of a triangulated mesh representation of an object. The method includes establishing a continuous bijective mapping between a first triangle mesh representation of the object and a second polygonal mesh representation of the object during the application of at least one mesh connectivity operation selected from a set of mesh connectivity operations. Establishing the mapping includes using a set of charts where an individual chart encodes a mapping of a single face of the second polygonal mesh representation to a plurality of triangles of the first triangle mesh representation that the single face of the second mesh representation overlaps with parametrically. The method further includes updating at least one chart of the set of charts in response to each application of the at least one mesh connectivity operation. An edge smoothing operation may be applied to smooth the continuous bijective mapping across chart boundaries.

26 Claims, 10 Drawing Sheets

CHART MAPPING FROM CURRENT MESH $M^k$ TO INPUT MESH $M^0$

OTHER PUBLICATIONS

Cignoni, P. et al., "Metro: measuring error on simplified surfaces", 1998, The Eurographics Association, 8 pgs.

Lee, A. W. F., et al., "MAPS: Multiresolution Adaptive Parameterization of Surfaces", 1998, 10 pgs.

Sheffer, A., "Surface Parameterization for Meshing by Triangulation Flattening", 2000, Computational Science and Engineering Program, University of Illinois, 12 pgs.

Lee, A., et al., "Displaced Subdivision Surfaces", 2000, 10 pgs.

Ohtake, Y., et al., "Polyhedral Surface Smoothing with Simultaneous Mesh Regularization", 2000, pp. 1-9.

Stam, J., "On Subdivision Schemes Generalizing Uniform B-spline Surfaces of Arbitrary Degree", 2001, pp. 1-15.

Sander, P.V., et al., "Texture Mapping Progressive Meshes", 2001, 8 pg.

Praun, E., et al., "Consistent Mesh Parameterizations", 2001, 6 pgs.

Tasdizen, T., et al., "Geometric Surface Smoothing via Anisotropic Diffusion of Normals", 2002, University of Utah, 9 pgs.

Sheffer, A., et al., "Smoothing an Overlay Grid to Minimize Linear Distortion in Texture Mapping", 2002, pp. 1-20.

Gu, X., et al., "Geometry Images", 2002, 7 pgs.

Guskov, I., "Normal Meshes", 2002, 8 pgs.

Volkov, V., et al., "Real-Time Refinement and Simplification of Adaptive Triangular Meshes", 2003, Proceedings IEEE Visualization, IEEE Computer Society Press, pp. 155-162.

Kraevoy, V. et al., "Matchmaker: Constructing Constrained Texture Maps", 2003, Computer Science Department, Technion-Israel Institute of Technology, 8 pgs.

Surazhsky, V., et al., "Isotropic Remeshing of Surfaces: A Local Parameterization Approach", 2003, 10 pgs.

Alliez, P., et al. "Anisotropic Polygonal Remeshing", 2003, pp. 485-493.

Volkov, V., et al., "Adaptive Triangular Meshes for Cloth Simulation", 2004, 12 pgs.

Kraevoy, V., et al., "Cross-Parameterization and Compatible Remeshing of 3D Models", 2004, pp. 1-9.

Schreiner, J., et al., "Inter-Surface Mapping", 2004, 8 pgs.

Owen, S., "A Survey of Unstructed Mesh Generation Technology", 2 pgs.

Meyer, m., et al., "Generalized Barycentric Coordinates on Irregular Polygons", 5 pgs.

INPUT TRIANGLE (DASHED LINES) CLIPPED BY
A CURRENT TRIANGLE (SOLID LINES)

CHART MAPPING FROM CURRENT MESH $M^k$ TO INPUT MESH $M^0$

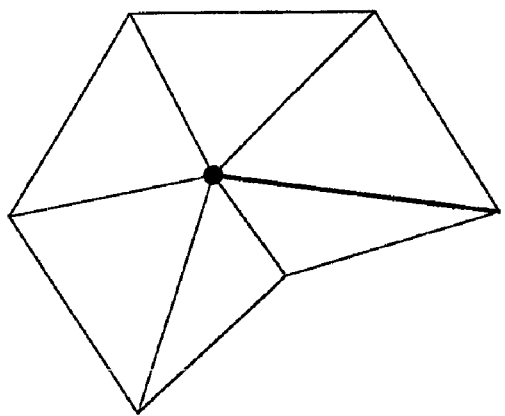
CONCAVE EDGE NEIGHBORHOOD
FIG.4A
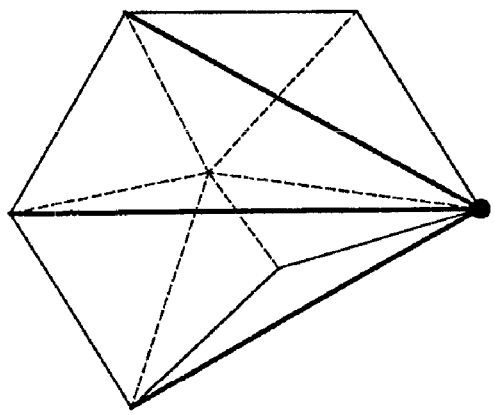
OVERLAPPING EDGE COLLAPSE
FIG.4B
OVERLAPPING TRIANGLES CREATED BY
A CONCAVE CONFORMAL PLANAR MAPPING
FIG.4

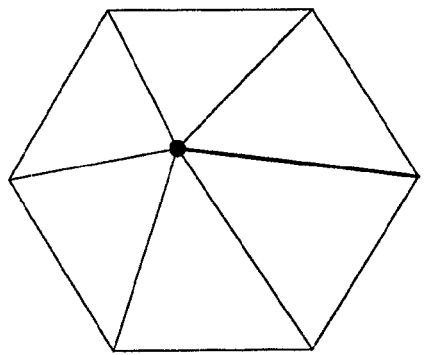
EDGE NEIGHBORHOOD
FIG.5A
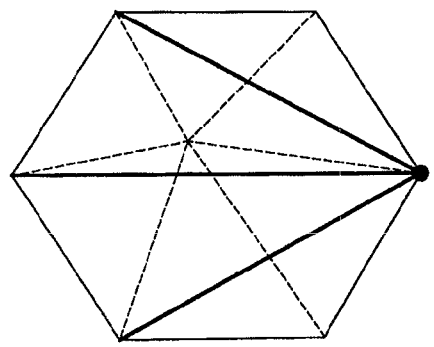
EDGE COLLAPSE
FIG.5B
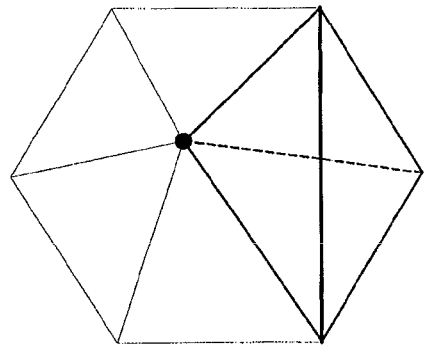
EDGE FLIP
FIG.5C
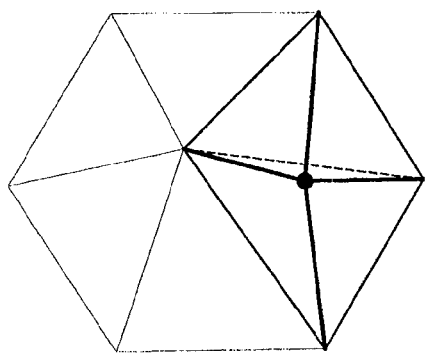
EDGE SPLIT
FIG.5D
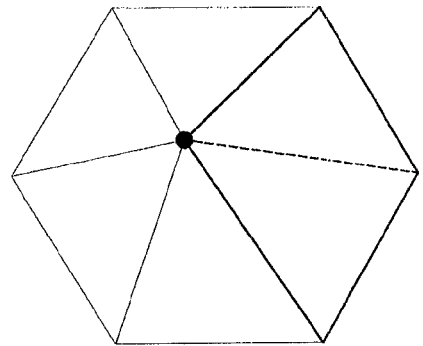
EDGE REMOVE
FIG.5E
EDGE OPERATIONS
FIG.5

EDGE BEFORE FLIP

INPUT CHART

INPUT CHART

MERGED COMMON CHART

FLIP IN PARAMETER SPACE

OUTPUT CHART

OUTPUT CHART

EDGE AFTER FLIP

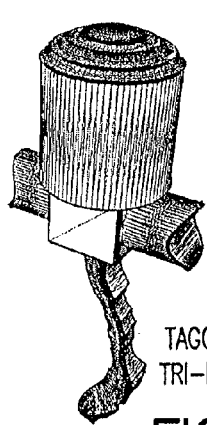
TAGGED INPUT
TRI-MESH (M⁰)
FIG.14A
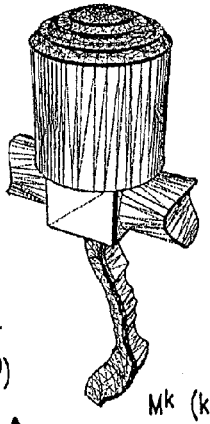
$M^k$ (k=8000)
FIG.14B
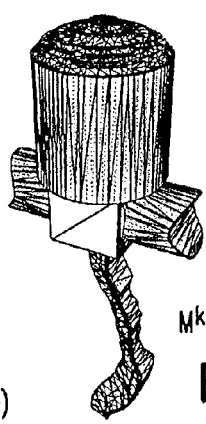
$M^k$ CHARTS (k=8000)
FIG.14C
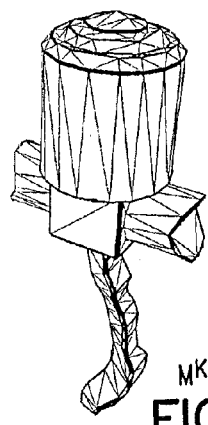
$M^k$ (K=10200)
FIG.14D
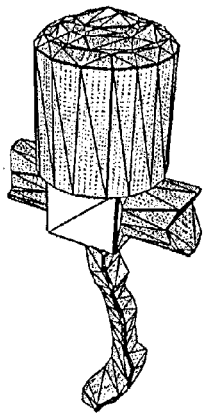
$M^k$ CHARTS (K=10200)
FIG.14E
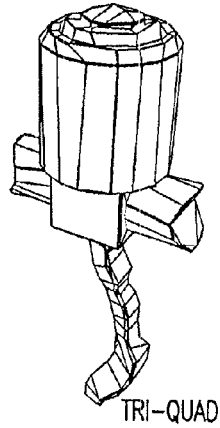
TRI-QUAD-MESH
FIG.14F
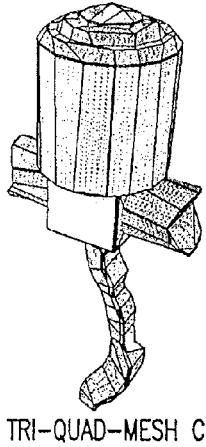
TRI-QUAD-MESH CHARTS
FIG.14G
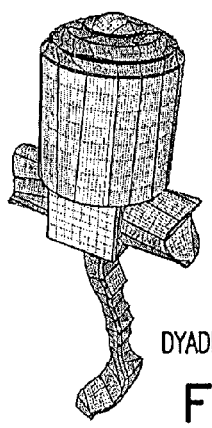
DYADIC RESAMPLING (n=3)
FIG.14H
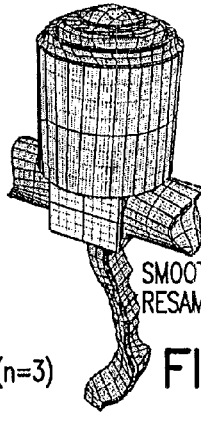
SMOOTHED DYADIC RESAMPLING (n=3)
FIG.14I
PROCESS PIPELINE
FIG.14

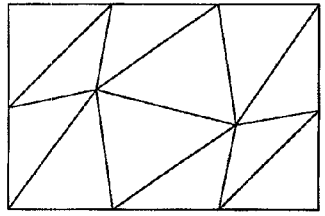
INPUT MESH
FIG.15A
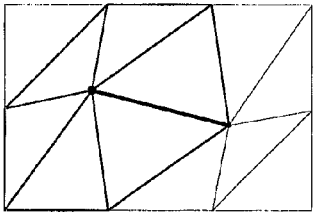
EDGE TO BE COLLAPSED
FIG.15B
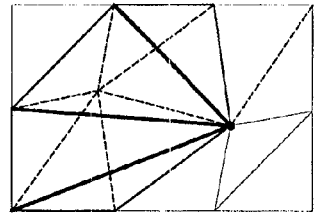
EDGE COLLAPSE CHARTS
FIG.15C
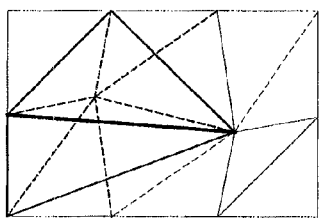
EDGE TO BE FLIPPED
FIG.15D
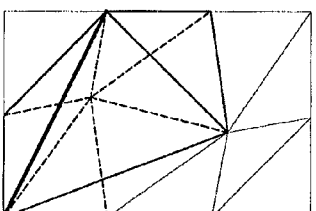
EDGE FLIP CHARTS
FIG.15E
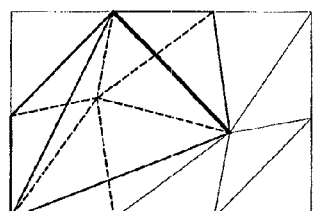
EDGE TO BE FLIPPED
FIG.15F
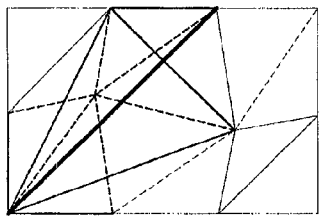
EDGE FLIP CHARTS
FIG.15G
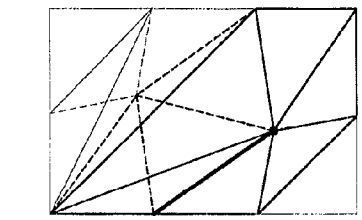
EDGE TO BE COLLAPSED
FIG.15H
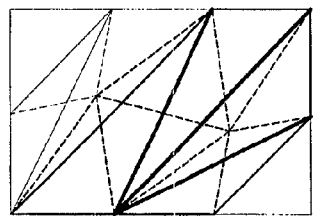
EDGE COLLAPSE CHARTS
FIG.15I
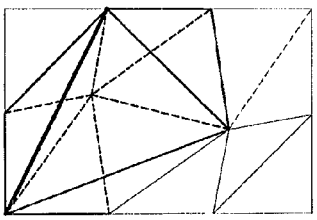
FINAL MESH WITH CHARTS
FIG.15J
EDGE OPERATIONS EXAMPLE
FIG.15

METHOD, APPARATUS AND COMPUTER PROGRAM PRODUCT ENABLING A DYNAMIC GLOBAL PARAMETERIZATION OF TRIANGLE MESHES OVER POLYGONAL DOMAIN MESHES

CROSS-REFERENCE TO RELATED APPLICATION

This is a continuation of and claims priority to U.S. patent application Ser. No. 11/044,359 filed on Jan. 26, 2005, now U.S. Pat. No. 7,310,097.

TECHNICAL FIELD

These teachings relate generally to systems and methods for the analysis and display of graphical information, in particular the analysis and display of visual representations of puree dimensional (3D) models of objects having shapes rendered with displayable surfaces.

BACKGROUND

Mesh families are extensively used in rendering and geometry processing applications. Progressive meshes are one of the most widely used representations for applications such as level-of-detail rendering, compression and transmission over communication networks. The progressive mesh representation can be viewed as a family of meshes generated from a given input mesh through repeated application of a single operation: the edge collapse. Other applications, such as high-quality fitting, remeshing and resampling typically require additional operations that lead to improved meshes according to certain criteria (such as the regularity of connectivity and/or approximation quality). Among the most commonly encountered additional operations are those known as edge swap, edge split and vertex insertion.

Many of the applications that make use of mesh families also rely on the existence of parameterization mappings between meshes in a family. For example, if the input mesh of the family has some properties (e.g., texture, color, analysis data), such a mapping is needed to transfer these properties to other meshes in the family which may be used as substitutes for the original mesh. Conversely, if certain computations are more readily performed onto a derived mesh (e.g., on a simplified version of the original), then a mapping back to the original mesh is necessary in order to transfer the results from the derived mesh to it. This is the case, for example, in skeletal deformation scenarios in which it is typically less computationally expensive to modify the coarse features represented by a simpler "skeleton mesh", and then transfer the modifications back to the detailed mesh. The availability of a mapping between a current and an input mesh is also important for robust remeshing and resampling methods, as it circumvents error-prone strategies such as those based on normal shooting.

Meshes often exhibit features such as sharp creases, curvature discontinuities, etc., which are important and need to be preserved throughout digital processing modifications. Both the set of operations applied to such meshes, as well as the parameterizations between them, should ideally respect and enforce these features.

Methods for establishing parameterizations between arbitrary meshes have recently emerged, as evidenced by V. Kraevoy and A. Sheffer, Cross-Parameterization and Compatible Remeshing of 3D Models. Proceedings of SIGGRAPH 04 ACM Transactions on Graphics Vol 23 No. 3,2004, p. 858-865, and by J. Schreiner and A. Asirvatham and E. Praun and H. Hoppe, Inter-Surface Mapping, Proceedings of SIGGRAPH 04 ACM Transactions on Graphics Vol 23 No. 3, 2004, p. 867-874. However, these approaches are not readily applicable to mesh families as they typically involve heavy computations which cannot be dynamically updated as local mesh operations are performed. Unlike in the case of establishing a mapping between un-related meshes, the problem of dynamically tracking and updating a parameterization through a family of meshes is different in that it has the benefit of an existing high-quality initial parameterization (the identity map), however it requires multiple updates as operations are incrementally applied to the input mesh to derive new meshes in the family.

The usefulness of mesh families and, in particular, of mesh hierarchies has been recognized by many authors. Lee et al. (A. Lee and W. Sweldens and P. Schröder and L. Cowsar and D. Dobkin, MAPS: Multiresolution Adaptive Parameterization of Surfaces, Proceedings of SIGGRAPH 98,1998, p. 95-104) were among the first to describe a method for parameterizing a family of meshes obtained by decimation from a given mesh "MAPS", and illustrated the resulting parameterization in the context of a remeshing application.

In P. Sander and J. Snyder and S. J. Gortler and H. Hoppe, Texture Mapping Progressive Meshes, Proceedings of SIGGRAPH 01, 2001, p. 409-416, there is described the parameterization of progressive mesh families (i.e., where a mesh updating operator consists of edge collapses only) with applications to texture transfer. In this case, the input mesh is first decomposed into charts, the simplification process follows taking into account the initial charts and the corresponding parameterizations, and lastly the chart parameterizations are optimized in another pass. It should be noted that the resulting parameterization is computed but once, and cannot be dynamically updated if additional edge collapses are performed. In fact, the edge collapse sequence is prescribed by the process of optimizing texture deviation.

There are multiple examples in recent literature that rely on mesh families for various applications. In addition to the ubiquitous progressive mesh representation (see H. Hoppe, Progressive Meshes", Proceedings of SIGGRAPH 96, 1996, p. 99-108), mesh families are useful in remeshing (see V. Surazhsky and P. Alliez and C. Gotsman, Isotropic Remeshing of Surfaces: a Local Parameterization Approach, Proc. of 12th International Meshing Roundtable, 2003, which offers an example in which a more complex set of operations is involved besides the usual edge collapse), resampling (see A. Lee and H. Moreton and H. Hoppe, Displaced Subdivision Surfaces, Proceedings of SIGGRAPH 00, 2000, p. 85-94), adaptive refinement (see V. Volkov and L. Li, Real-time Refinement and Simplification of Adaptive Triangular Meshes, In Proceedings of IEEE Visualization 2003, IEEE Computer Society Press, p. 155-162) and analysis. Note in this regard that finite element analysis relies heavily on local operations for mesh quality improvement for analysis purposes, see for example S. Owen, "A Survey of Unstructured Mesh Generation Technology", Proceedings 7th International Meshing Roundtable, Dearborn, Mich., October 1998.

Prior to this invention, no fully satisfactory dynamic method existed for establishing a mapping between the original mesh and the mesh(es) derived from it.

SUMMARY OF THE PREFERRED EMBODIMENTS

The foregoing and other problems are overcome, and other advantages are realized, in accordance with the presently preferred embodiments of these teachings.

In a first aspect thereof this invention provides a method to process data comprised of a triangulated mesh representation of an object. The method includes establishing a mapping between a first triangle mesh (the input mesh) representation of the object and a second polygonal mesh (the current mesh) representation of the object during application of at least one mesh connectivity operation selected from a set of mesh connectivity operations. Establishing the mapping includes using a set of charts where individual ones of the set of charts encodes a mapping of a single polygon of the second polygonal mesh representation to a plurality of triangles of the first triangle mesh representation that the single polygon of the second mesh representation overlaps with parametrically. The method further includes updating at least one chart of the set of charts in response to each application of the at least one mesh connectivity operation.

In a second embodiment thereof this invention provides a data storage medium storing program instructions readable by a computer, where execution of the program instructions results in processing of data comprised of a triangulated mesh representation of an object. The operations include, but are not limited to, establishing a continuous bijective mapping between a first triangle mesh representation of the object and a second polygonal mesh representation of the object during application of at least one mesh connectivity operation selected from a set of mesh connectivity operations. The operation of establishing the mapping comprises computing a set of charts, where an individual chart encodes a mapping of a single polygon of the second mesh representation to a plurality of triangles or portions thereof of the first triangle mesh representation that the single polygon of the second mesh representation overlaps with parametrically. The operations further comprise dynamically updating at least one chart of the set of charts in response to each application of the at least one mesh connectivity operation.

In accordance with a further embodiment of this invention there is provided a data processing system that comprises at least one data processor coupled to memory means and operating under control of a stored program to process data comprised of a mesh representation of an object stored in the memory means. The system further comprises means for establishing a continuous bijective mapping between a first triangle mesh representation of the object and a second polygonal mesh representation of the object during application of at least one mesh connectivity operation selected from a set of mesh connectivity operations, where the establishing means computes a set of charts for storage in the memory means. An individual chart encodes a mapping of a single polygon of the second mesh representation to a plurality of triangles or portions thereof of the first triangle mesh representation that the single polygon of the second mesh representation overlaps with parametrically. The system further means to dynamically update at least one chart of the set of charts in response to each application of the at least one mesh connectivity operation.

In the preferred, but non-limiting embodiments of this invention the set of connectivity operations comprise operations selected from at least some of an edge collapse operation, an edge flip operation, an edge split operation, and an edge remove operation. In addition, there is presented an edge smoothing operation that does not affect the connectivity of the current mesh, but aids in smoothing the resulting parameterization.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 4A and 4B show overlapping triangles created by a concave conformal parameterization onto the plane.

FIGS. 5A-5E illustrate an edge neighborhood and an edge collapse, an edge flip, an edge split, and an edge remove operation, respectively.

FIG. 14 graphically depicts the overall dynamic global parameterization of triangle meshes over polygonal domain meshes and the application to remeshing and resampling with subdivision connectivity process in accordance with the embodiments of this invention. FIG. 14A graphically illustrates the input triangle mesh $M^0$ with feature edges tagged with thick lines. FIGS. 14B and 14D graphically illustrate the current mesh $M^k$ after a given number of operations. FIGS. 14C and 14E graphically illustrate the chart parameter mappings of the input triangles (light dashed lines) of $M^0$ in FIG. 14A onto the faces of the respective current meshes $M^k$ (solid dark lines) shown in FIGS. 14B and 14D. FIG. 14F graphically illustrates a triangle-quad-mesh (i.e., a mesh with faces that are either triangles or quadrilaterals) produced by pairing triangles from MK shown in FIG. 14D. FIG. 14G graphically illustrates the input triangles (light dashed lines) of $M^0$ in FIG. 14A mapped onto the triangle-quad domain mesh in FIG. 14F (solid dark lines). FIG. 14H graphically illustrates the semi-regular resampling of the input mesh $M^0$ using the computed bijective parameterization mapping (three levels of dyadic splits are shown). FIG. 14I graphically illustrates the application of the parameterization method taught by this invention to perform quadrilateral remeshing of the input mesh. First the tri-quad mesh of FIG. 14H is converted to an all quad mesh by one step of midpoint subdivision (i.e., each quad face is split into four quad subfaces and each triangle face is split into three quad subfaces by connecting the center of each face to the midpoints of its edges). A smoothing of the parameterization in accordance with this invention is applied to generate a smooth global parameterization the input mesh $M^0$ over the quad domain mesh.

FIGS. 15A-15J, collectively referred to as FIG. 15, show various examples of edge operations.

DETAILED DESCRIPTION OF THE PREFERRED EMBODIMENTS

Figure 1:
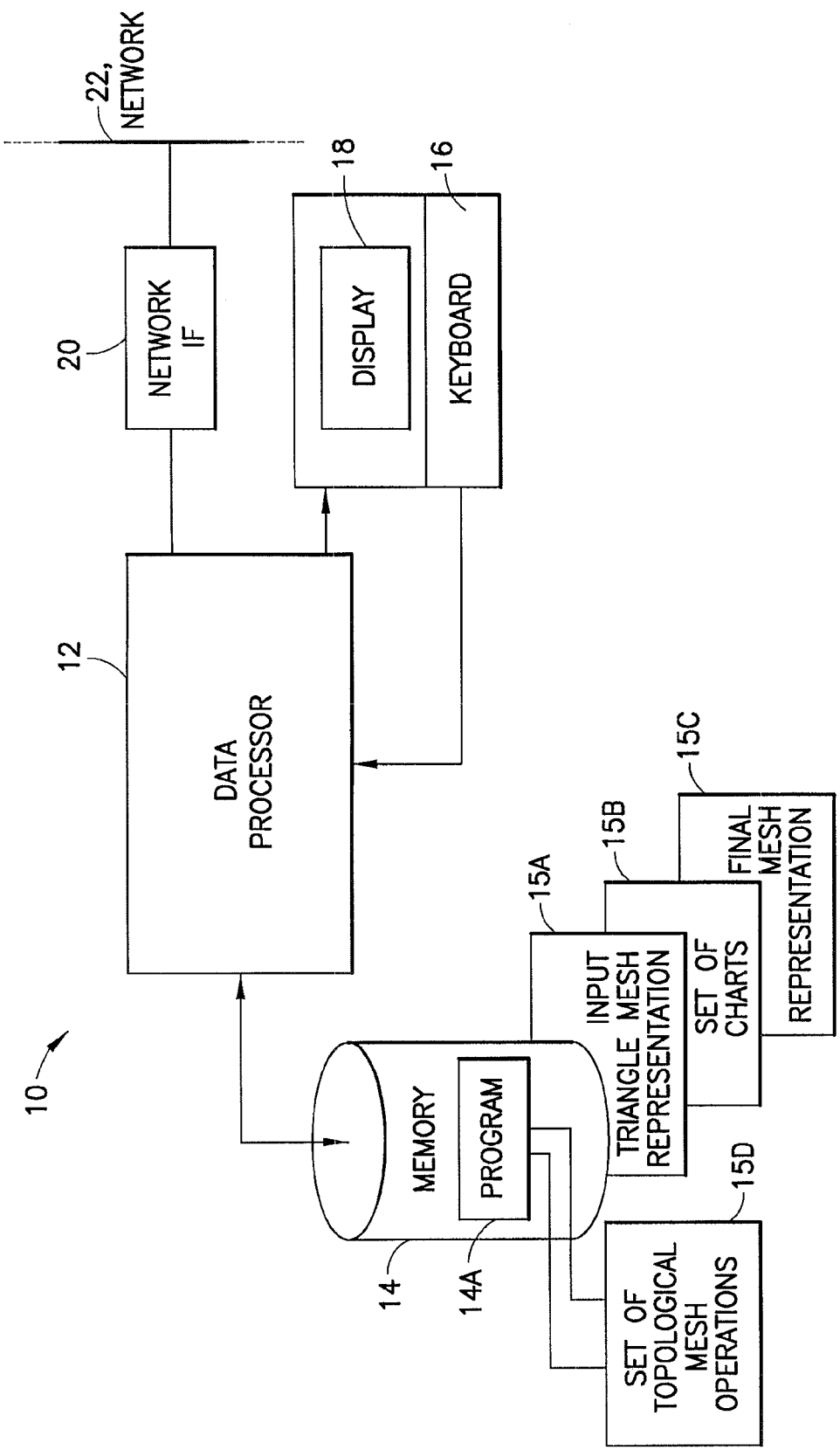
FIG. 1 is block diagram of a data processing system that is suitable for practicing the teachings of this invention.

Reference is made to FIG. 1 for showing a non-limiting embodiment of a data processing system 10 that is suitable for practicing the teachings of this invention. The system 10 includes at least one data processor 12, a memory 14 and a user interface that typically includes a user input device or devices, shown as a keyboard 16, and a user output device or devices, shown as a display 18. A network interface (IF) 20 can be provided for coupling the system 10 to an external network 22, which may be an intranet such as a local area network (LAN), or it may be or provide access to a global communications network such as the Internet. The memory 14 is assumed to include a program storage portion 14A where computer code is stored for implementing the presently preferred mesh parameterization methods, procedures and algorithms, as described in detail below. The computer code can be resident on or in any suitable computer-readable medium, such as a fixed or removable disk, a tape, or a semiconductor memory device.

The memory 14 is shown as having storage for data, including a first or input (also referred to as a input or source) triangle mesh representation 15A of an object of interest, such as in the example of FIG. 14A, and further including set of charts 15B, and at least one second or final (also referred to as a target) polygonal mesh representation 15C. Typically the input triangle mesh representation 15A has triangles related to the dynamic in-process polygonal mesh representation 15C, which may be referred to as a current polygonal mesh representation. In accordance with an aspect of this invention, in the set of charts 15B each individual chart encodes a mapping of a single polygon of the second mesh representation 15C to a plurality of triangles of the first triangle mesh representation 15A that the single polygon of the second mesh representation 15A overlaps with parametrically. In accordance with a further aspect of this invention, execution of the program 14A operates to establish a mapping between the first triangle mesh representation 15A and the second polygonal mesh representation 15C during application of at least one mesh connectivity operation selected from a set of mesh connectivity operations 15D. The mapping operation includes updating at least one chart of the set of charts 15B in response to each application of the at least one mesh connectivity operation from the set of connectivity operations 15D. Execution of the program 14A further results in evaluating barycentric locations of individual ones of the polygons of the second mesh representation 15C by performing a point location in the parameter domain defined by the second mesh and by using a corresponding chart of the set of charts 15B to find a corresponding triangle of the first mesh representation 15A, and interpolating within the corresponding triangle of the first mesh representation 15A. Execution of the program 14A may further result in tagging at least one feature in the input triangle mesh representation 15A. In a presently preferred, but non-limiting embodiment of this invention the set of connectivity operations 15D include an edge collapse operation, an edge flip operation, an edge split operation, and an edge remove operation. In addition, an edge smoothing operation is provided to smooth out the resulting parameterization across chart boundaries.

As was discussed above, mesh families, that is, sequences of meshes derived from one another through a set of mesh operations, commonly arise in various applications, including level-of-detail rendering, multiresolution editing, remeshing, and compression. In general, given an input mesh and a sequence of meshes derived from it by certain operations (e.g., connectivity modifications), prior to this invention no straightforward method existed for establishing a mapping between the original mesh and the mesh(es) derived from it. Such a mapping is useful in many applications that require transferring properties of the original mesh (e.g., texture, analysis results) to the derived meshes, or that provide for resampling and remeshing of the original mesh over a derived mesh, or that transfer properties computed over a (typically simpler) derived mesh back to the original mesh.

Described below in accordance with embodiments of this invention is a method, system and computer program product for dynamically computing a global parameterization mapping between a given arbitrary original triangle mesh and a mesh or meshes derived from the original mesh through local mesh operations. This parameterization can be shown to be useful in the context of a number of important applications that include, but that are not limited to, texture transfer, remeshing with subdivision connectivity, and skeletal animation.

By way of introduction, the embodiments of this invention enable the consideration of families of homeomorphic meshes defined by an equation of the form:

$$M^{n+1} = U(M^n), \quad (1)$$

where U is a mesh updating operator and $M^0$ is a given input or generator mesh. The presently preferred implementation of U considers several of the most common local operations, including but not necessarily limited to: edge collapses, edge splits, edge flips, and edge removals. Other operations can be accommodated in a similar fashion such as, but not limited to, an operation to perform an insertion at an arbitrary barycentric location of a current polygon. In addition, edge smoothing, that is smoothing of the parameterization across a chart boundary is useful and can be easily implemented in a fashion similar to the connectivity modification operations.

Each mesh M is characterized by a triplet (V,K,A), where V represents the geometric information associated with the mesh, i.e., its vertex positions $p_i = (x_i, y_i, z_i)$, K denotes the simplicial complex defining the mesh connectivity in terms of vertices, edges, and faces, and A represents auxiliary information associated with the mesh (for example, differential properties, texture, color, various types of feature tags).

Of interest to the embodiments of this invention are bijective parameterization maps $\phi: M^k \to M^0$, for k=1, 2, . . . A bijective mapping is invertible, such that any parametric location within $M^0$ has a unique parametric location within $M^k$ and vice versa.

In the preferred embodiments of this invention the parameterization is generated dynamically, during the process of deriving a new mesh. However, these teachings go beyond the MAPS approach mentioned above in several important areas. First, the preferred mesh update operator U allows for various types of operations besides simplification/decimation, thus increasing the applicability of the method to classes of problems that are not solvable by mesh simplification alone. Second, instead of successively computing the mapping of vertices of $M^0$ onto derived meshes, $M^0$ is decomposed into charts; and the charts are updated dynamically as U is applied. Once the charts 15B are computed they allow for a very efficient point location, a frequently performed operation in applications that involve resampling of the original mesh 15A in some form (e.g., for remeshing, for transfer of properties, etc.). Further, the embodiments of this invention support the derivation of polygonal meshes with faces that are not necessarily triangles, which is a useful operation for applications such as editing and analysis that traditionally favor quad elements for their tensor-product nature.

Described now are presently preferred methods and algorithms for accomplishing the dynamic parameterization of families of meshes. Beginning with an input mesh, the input triangle mesh representation 15A shown in FIG. 1, at least one new mesh can be derived from it by applying a sequence of local mesh connectivity operations. A method to generate a continuous bijective mapping between the input mesh 15A and any of the derived meshes 15C is provided, as is a method to dynamically update the mapping as new operations are performed.

An aspect of this invention is the provision of a framework for decomposing a given source mesh 15A into the set of charts 15B corresponding to regions parameterized over faces of a derived target mesh 15C. As the target mesh 15C changes as a result of application of the local operations from the set of connectivity operations 15D, the affected charts 15B are updated on-the-fly without the need for re-computing the entire mapping. This technique beneficially guarantees a continuous, globally valid, bijective mapping between the source mesh 15A and any derived target mesh 15C at any point in the derivation process. No restrictions are imposed on the topology of the source mesh 15A.

The embodiments of this invention consider updates corresponding to common mesh update operations used in many applications: edge collapses, edge splits, edge flips, and edge removals. Other operations can be accommodated in a similar fashion.

The presently preferred dynamic parameterization method takes into account model features, and the resulting maps ensure feature correspondence.

The dynamic parameterization of mesh families is beneficial in a number of applications, as it enables the transfer of properties between meshes while avoiding expensive computations of maps between arbitrary meshes each time a local modification is performed. A "running" parameterization, available at all times during the mesh updating process, can be used to drive the mesh modification process by providing access to the original geometry (for example to compute fitting error estimates, or to query information associated with the input mesh such as normals and curvatures). The resulting parameterization between any two meshes in a family may be used for those digital processing tasks that make use of parameterizations, including texture mapping, remeshing, resampling, morphing, and animation.

Figure 2:
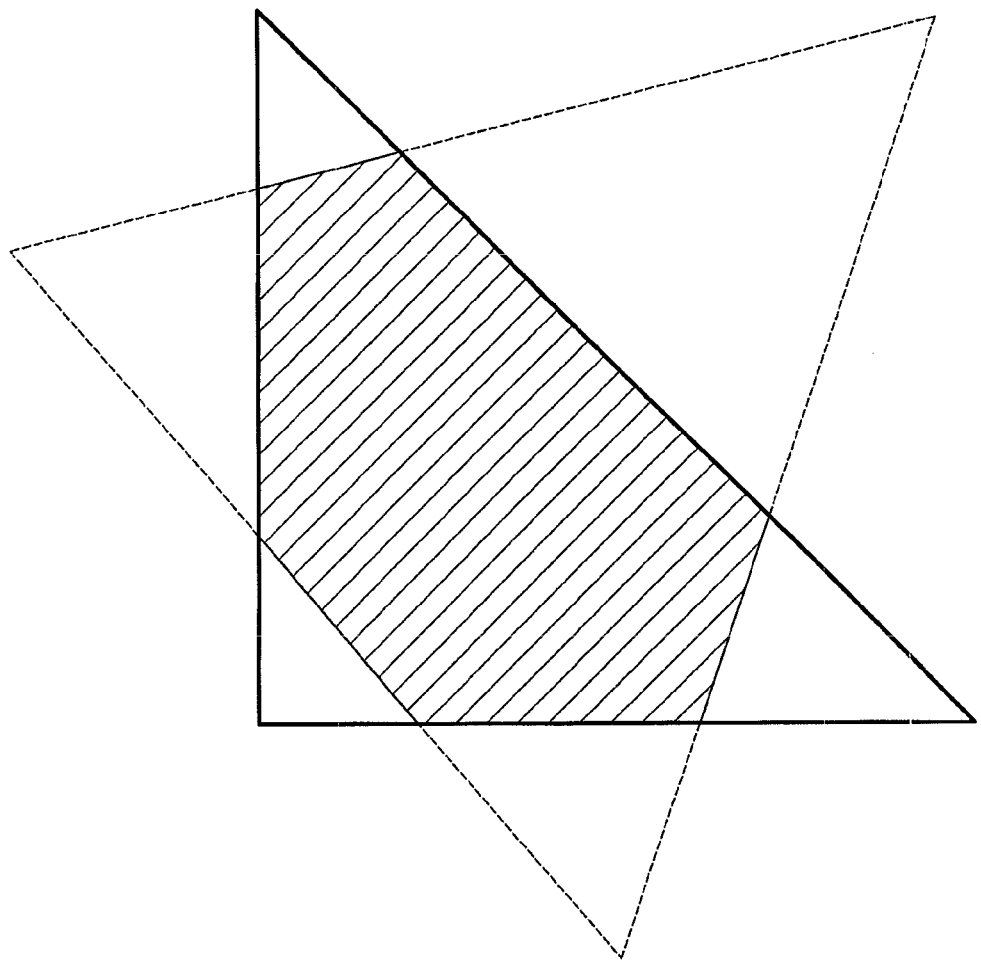
FIG. 2 shows an input triangle clipped by a polygon (a triangle) of the current mesh.

A presently preferred dynamic parameterization algorithm maintains a parametric mapping between the input triangle mesh 15A and a polygon of the current mesh 15C which has undergone a series of mesh operations. The parameter mapping is represented per current triangle with one chart of the set of charts 15B that covers a portion of the input mesh. Input triangles within a chart 15B may span current face boundaries, in which case they are clipped at the current mesh face boundaries, FIG. 3. FIG. 2 shows an input triangle clipped by a current face (another triangle in this example). In what follows a chart mesh is defined to be the submesh of the input mesh corresponding to a chart of the set of charts, along with one or two intersection positions per edge expressed in barycentric coordinates and indicating clipping points of input mesh edges with respect to a current mesh face.

In a presently preferred embodiment an algorithm forming a part of program 14A is initialized by constructing an identity mapping between the input triangle mesh 15A and an initial (starting) face of the current mesh 15C. At this point each chart mesh corresponding to a chart of the set 15B is a single triangle that corresponds to one input triangle. Then, one after another, the connectivity mesh operators 15B are applied as needed. This operation may be controlled automatically by a priority queue, or manually with user interaction via the keyboard 16 and display 18. With each operation, the parameter mapping charts corresponding to the affected faces of the current mesh are updated accordingly. Operators are applied one at a time until a desired (final) current mesh 15C is achieved, and a parametric mapping is maintained at all times between the in-process current mesh and the input mesh 15A.

The presently preferred embodiments of this invention are supported, by example and not as a limitation, over at least four different mesh connectivity operations: edge collapse, edge flip, edge split, and edge remove. FIGS. 5B, 5C and 5D show the edge collapse, edge flip, and edge split operations, respectively. During an edge collapse operation, one endpoint of the edge is moved onto the other endpoint. Referring also to the graphical illustration shown in the transition from FIG. 5A to FIG. 5B, two triangles are removed in this process, and the charts corresponding to the starting triangles are recomputed according to the resulting current mesh triangles. This operation is preferably used to reduce the number of faces in the mesh. The edge flip operation, shown in the transition from FIG. 5A to FIG. 5C, swaps the diagonal of the quadrilateral made by the union of the two triangles adjacent to it. The charts corresponding to the two starting triangles are recomputed according to the two resulting current mesh triangles. This operation is useful for balancing the valences of the vertices of the mesh. In order to add more vertices to the mesh, the edge split operation is used. The edge split operation, shown in the transition from FIG. 5A to FIG. 5D, inserts a vertex along an edge between two triangles and connects it to the opposite vertices of the two adjacent triangles. The charts of the two starting triangles are redistributed to the four resulting current mesh triangles.

The operations as described so far transform a given triangle mesh into another triangle mesh. To support applications where combined triangle/quadrilateral meshes or quadrilateral meshes are desired, the edge remove operator is preferably used. An edge removal operation, shown in the transition from FIG. 5A to FIG. 5E, pairs the two neighboring triangles into a quadrilateral (a quad). After an edge removal, none of the edges adjacent to the newly formed quad are operated upon. The two triangle charts are retained, and a logical quadrilateral parameterization is layered on top of them. The chart meshes of the two triangles are preferably redistributed so as to better map the quadrilateral parameterization, thereby providing a smoothing operation. Reference in this regard can also be made to FIGS. 14E and 14G.

Another operation that affects only the parameterization is an edge smooth operation. The chart meshes of the two triangles adjacent to an edge are merged and smoothed and then re-assigned between the two triangles, without changing the current mesh 15C.

Each connectivity operation is accompanied by an update of the parameter charts 15B of the current mesh faces affected by the connectivity operation. These updates follow the same general structure for all of the operations, though the specific planar parameterizations may differ.

Figure 7:
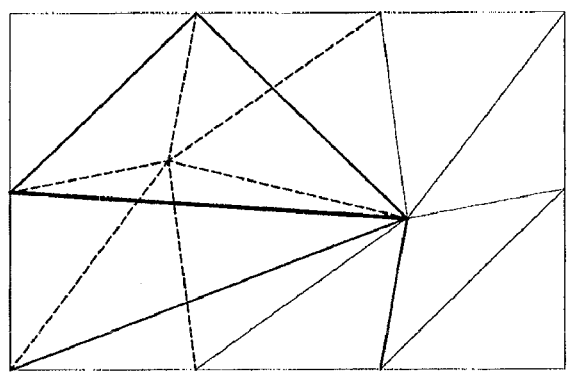
FIGS. 7-11, 12A, 12B and 13 illustrate exemplary steps of parameterization updates during an edge flip operation.

First, the faces in the neighborhood of the edge operation are mapped to a common parameter plane, so that their corresponding mesh charts can be combined. FIG. 7 shows an illustrative edge neighborhood. For an edge collapse, the neighborhood is the ring of faces adjacent to the endpoint that is removed, while for all the other operations, the neighborhood consists of the two faces adjacent to the edge. It is desirable that the planar parameterization be as conformal as possible, but preferably the boundary edges of the region should map to a convex polygon. This is desirable so that the new edges created in the edge collapse, flip, and split operations can be straight lines in the common parameter space.

FIGS. 4A and 4B show that inverted and overlapping triangles may be created if the boundary is not convex (i.e., it is concave).

The presently preferred embodiments of this invention use a planar parameterization that maps the boundary vertices to positions on a unit circle, where the angle allocated to each boundary edge is proportional to the length of the edge. In the case of an edge collapse (FIG. 5B), there is one internal vertex whose location is assigned using a relaxation operator. For example, one may use Laplacian relaxation, where the location of neighboring vertices are weighted by the lengths of the edges connecting them to the central vertex in the current mesh.

Figure 8:
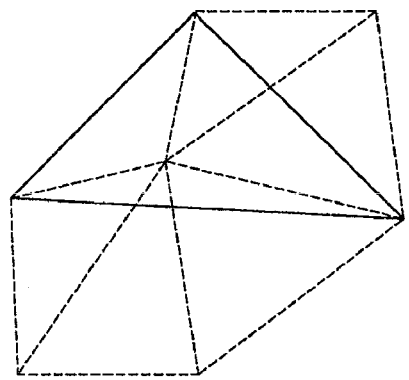
Figure 9:
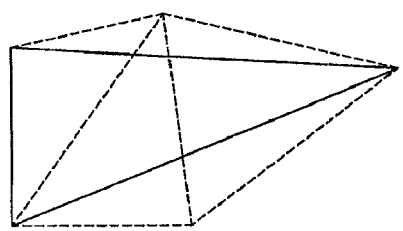
Figure 10:
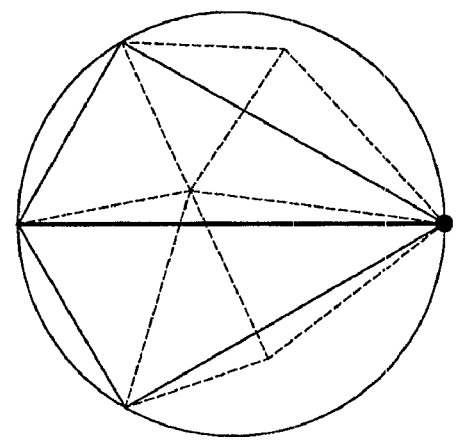

Once the planar parameterizations have been defined for all of the starting current mesh faces, the corresponding chart meshes, see FIGS. 8 and 9, are mapped into a common parameter plane by the barycentric coordinates of their current mesh face. The meshes are then merged together into a common chart mesh over the region of the operation. This merge operation is readily performed because these chart meshes are adjacent overlays onto the input mesh, which contains all of the necessary connectivity information (see FIG. 10).

The piecewise planar parameterizations of portions of split input triangles can produce flipped input triangles in the common chart. Laplacian relaxation weighted by the lengths of edges in the input mesh is preferably applied to remove any flipped triangles.

Figure 11:
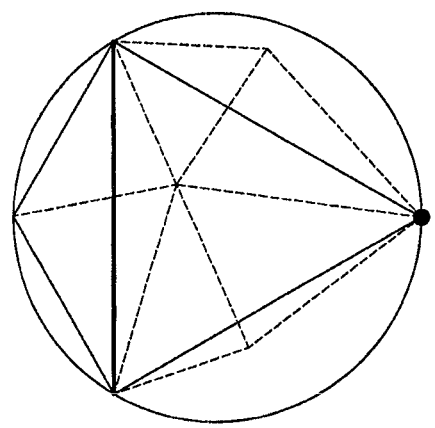

Next the output set of current mesh faces is constructed, dependent on the operation, as shown in FIGS. 5A-5E, which illustrate the edge neighborhood and the edge collapse, edge flip, edge split, and edge remove operations, respectively. FIG. 11 shows this for the edge flip example. For each of the resulting current mesh faces the following steps are performed. The common chart mesh is copied and the parameters are transformed to barycentric coordinates of the current mesh face. Then the chart mesh is clipped to the boundary of the face, which labels vertices as either being interior or exterior and computes edge intercept positions on the boundaries.

After all of the chart meshes are created and clipped, the discrete nature of the input mesh domain is used to resolve any ambiguities due to floating point calculations. Each vertex of the common chart mesh is coerced to exist in exactly one of the resulting charts, and the barycentric location of that input vertex in the current mesh is updated.

Figure 12A:
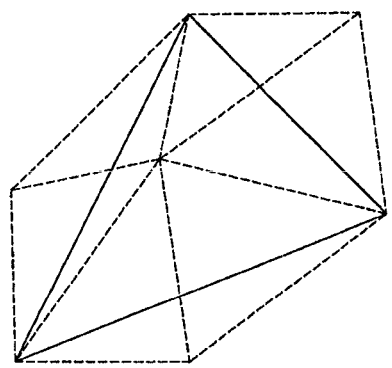
Figure 12B:
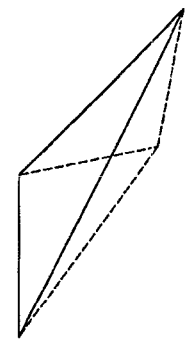

Next, chart triangles that have been marked exterior to the corresponding current mesh face are pruned away, (see FIGS. 12A and 12B). This ensures that size of the union of all chart meshes is proportional to the size of the input mesh.

Figure 13:
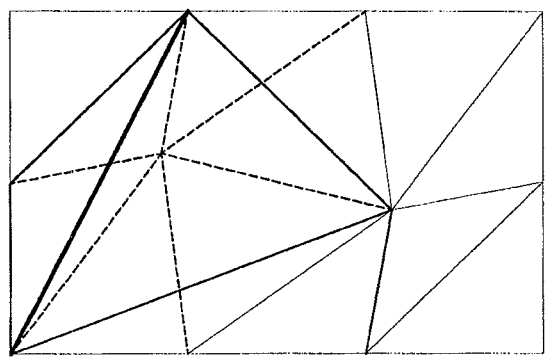

This procedure is repeated for each edge operation that is performed, in order to maintain the bijective mapping. In addition, edge smoothing operations may be performed within the one ring neighborhood of other operations in order to smooth the parameterization globally across the entire current mesh. FIG. 13 shows the resulting edge after the edge flip operation.

FIG. 15 shows a sequence of an edge collapse followed by two edge flips and then a second edge collapse. The input mesh has an identity mapping to the initial current mesh, so the charts are simple triangles, as in FIG. 15A. In the following steps, the edges of the faces of the current mesh involved in the current operation are solid black. The edges and vertices affected by the current operations are highlighted in bold. The edges of the input mesh present in the charts are shown as dashed lines. The edges of the charts corresponding to the faces of the current mesh in the current operation are black. All edges that are not involved in the current operation appear in gray. FIGS. 15B and 15C show the current mesh and its charts before and after an edge collapse, respectively.

FIGS. 15D and 15E show the current mesh and its charts before and after an edge flip, respectively. FIGS. 15F, 15G and 15H show another edge flip, followed by an edge collapse and finally, the current mesh and its charts after all four operations have completed, respectively.

The parameterization technique as described above may be used to map arbitrary points on the input mesh to the current mesh or vice versa. The input mesh may be evaluated over the current mesh by using the barycentric locations stored in the chart meshes. The mapping from a current mesh barycentric location $(T_c, u_c, v_c)$ involves point location within the chart mesh. Here $T_c$ is the current mesh triangle and the barycentric coordinates within the triangle are $u_c+v_c+w_c=1$. An $O(\sqrt{n})$ search of convex polygons (e.g., see Guibas and Stolfi 1985) is used to locate the convex region in the chart mesh corresponding to the input triangle $T_f$. This chart mesh region will have three to six sides, thus it is preferred to use generalized barycentric coordinates (see M. Meyer, "Generalized Barycentric Coordinates on Irregular Polygons," Journal of Graphics Tools 2002) to transform to barycentric coordinates $(u_f, v_f)$ in the input triangle. The 3D position on the input mesh can then be evaluated using the parametric location $(T_f, u_f, v_f)$.

The parameterization is guaranteed to be $C^0$, i.e. positionally continuous throughout, and the higher order discontinuities at the current triangle boundaries may thus be noticeable.

One non-limiting application of the parameterization in accordance with this invention is to resample the input surface with subdivision connectivity. In order to create samples that are close to samples created by a subdivision surface process, a method iteratively optimizes the parameter samples through a process of smoothing. This process starts by sampling the parameterization at regular dyadic points. Then the process iteratively smoothes the corresponding 3D positions and performs a local search in parameter space to find the closest point on the surface to this goal position. Various smoothing masks may be used for the smoothing operation. In the preferred embodiment, smoothing kernels as described in J. Stam, "On Subdivision Schemes Generalizing Uniform B-spline Surfaces of Arbitrary Degree", Computer Aided Geometric Design. Special Edition on Subdivision Surfaces, Volume 18, 2001, 383-396 are used The Loop stencil is used for triangle resampling and the Catmull-Clark stencil is used for quadrilateral resampling.

The local search in parameter space is conducted by moving towards one of the several discrete neighbor samples and testing which 3D position is closest to the goal. On patch boundaries, the 3D position is determined by moving in a full disc in parameter space, but the parameter space values are limited to lie on the boundary of the corresponding face.

Feature tagging is supported in all of the connectivity operations. For example, edges of the triangle mesh corresponding to normal or curvature discontinuities in the input mesh representing a surface may be tagged. For the case of an edge collapse along a feature edge, the tagged edge splits the common chart mesh into one or two half disc parameterizations corresponding to the connectivity near a boundary vertex, as opposed to a single full disc parameterization around a smooth vertex. This operation changes the planar parameterization slightly and the parameter relaxation allows for crease vertices to slide along a straight crease edge in parameter space. It is also desirable to eliminate input triangles that have two feature edges. These triangles may vanish from the chart mesh parameterizations if one of the feature edges is collapsed in the current mesh. This is avoided by detecting these triangles in the input mesh and performing an edge split on the third edge before the charts are initialized. This splits the triangle such that the resulting two triangles each have only one feature edge.

Figure 6:
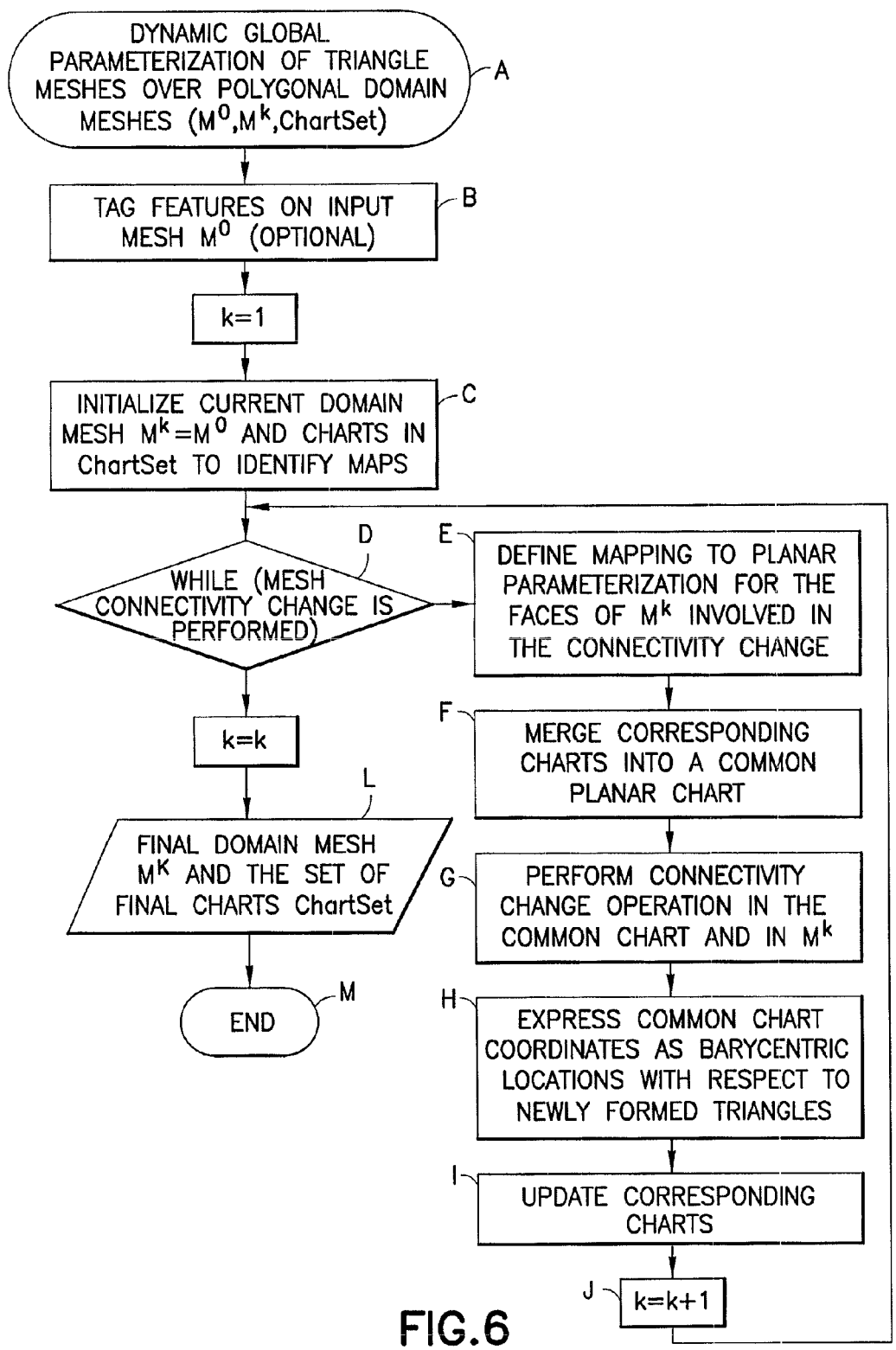
FIG. 6 is a logic flow diagram that illustrates the operation of the presently preferred embodiment of this invention.

FIG. 6 is a logic flow diagram that illustrates the operation of the presently preferred embodiment of this invention. FIG. 6 may also be viewed as a block diagram of an interconnected group or cluster of data processors or data processing elements or modules or units that cooperate so as to process data comprised of a triangulated mesh representation of an object stored in the memory 14, in accordance with the embodiments of this invention. It is assumed that the program memory portion 14A of the memory 14 of FIG. 1 contains computer program code for implementing the following steps. Block A represents the start of the dynamic global parameterization of triangle meshes over polygonal domain meshes operation with data $M^0$ (triangulated input mesh), $M^K$ (polygonal domain mesh), and a set of charts that define the parameterization of $M^0$ over $M^k$. Block B represents an optional step of tagging the features, as described above. Briefly, tagging an edge as a feature defines it topologically as a boundary edge so the parametric neighborhood near it is a half disc instead of the full disc corresponding to a smooth surface point. Block C shows the initialization of the current domain mesh, such that $M^k=M^0$. Blocks D, E, F, G, H, I, and J represent an iteration that is executed while connectivity changes are performed. The iteration includes computing the planar parameterization (Step E), flattening and merging the charts into a common planar chart (Step F), performing a connectivity operation (Step G, e.g., edge collapse as in FIG. 5B; edge flip as in FIG. 5C; edge split as in FIG. 5D; or edge remove as in FIG. 5E), remapping the common chart to each of the resulting faces (Step H), and the updating of the charts of the resulting faces by clipping the common chart against face boundaries and pruning away exterior parts of input triangles (Block I). When connectivity changes are no longer performed the iteration ends, and control passes to Block L where the final domain mesh ($M^K$) and a parameterization defined by the final charts in ChartSet are gathered. The process then ends at Block M. The stopping criteria at Block D may be determined, as non-limiting examples, by user intervention, such as through input through the data input 16, or by a bound on the number of operations, or a bound on the fidelity of the current mesh to the input mesh.

Figure 3:
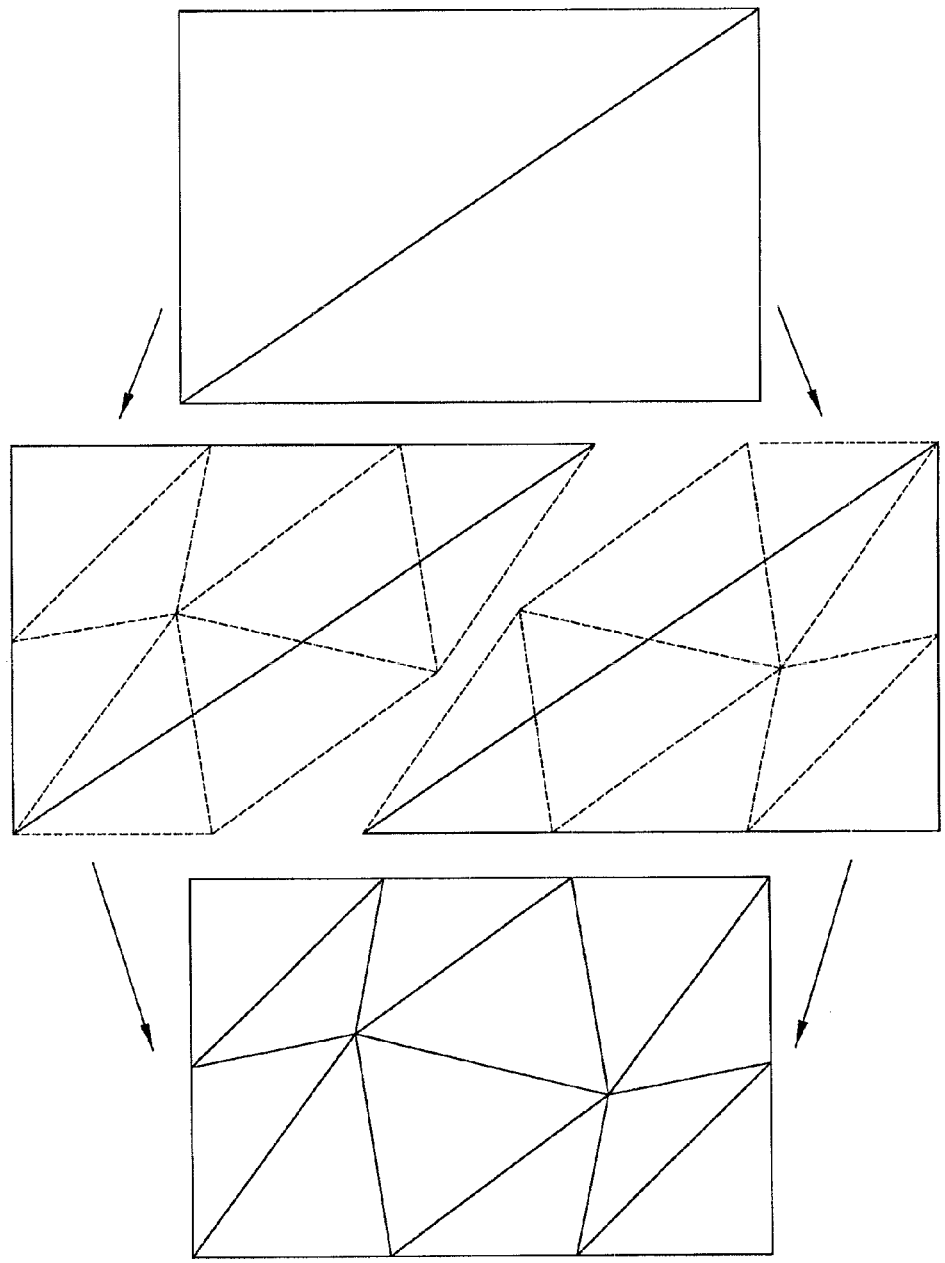
FIG. 3 is a graphical depiction of charts in relation to an input mesh $M^0$ and a current or output mesh $M^k$.

FIG. 3 graphically illustrates the process of current mesh to input mesh parameterization, and the transition from the current mesh 15C to the input mesh 15A via the chart 15B.

FIGS. 7-11, 12A, 12B and 13 graphically illustrate an example of edge flip parameterization, and show an initial 3D triangle input mesh, an associated common chart mesh, the resulting (fewer) current triangles, and the associated new chart meshes.

FIGS. 14A and 14E graphically illustrates the maintenance of parameters mapping for an input triangle mesh (see also FIG. 3) and the resulting parameter chart mesh representation based on the set of charts 15B. The Figure represents the updating of the parameters charts with every edge operation (e.g., edge collapse as in FIG. 5B; edge flip as in FIG. 5C; edge split as in FIG. 5D; or edge remove as in FIG. 5E), and the parameterization of the input triangles over the current mesh faces. FIGS. 14D and 14F graphically illustrates an edge removal operation to form quads, which is useful to avoid the stranding of triangles, while FIG. 14G graphically illustrates the input triangles (light dashed lines) of $M^0$ in FIG. 14A mapped onto the triangle-quad domain mesh in FIG. 14F (solid dark lines). FIG. 14H shows the resampling of the tri-quad domains from the input mesh representation in FIG. 14A to form a resampled all-quad representation. A Catmull-Clark remeshing pattern (see E. Catmull and J. Clark, Recursively Generated {B}-Spline Surfaces on Arbitrary Connectivity Meshes, CAD, 10(6), 1978, p. 350-355) can be used for the samples, and multi-resolution analysis for the base mesh extraction. Here samples are generated by dyadically splitting the parameter space at edge and face centers and connecting the face centers to the edge centers to form all quadrilaterals. FIG. 14I shows that the sampling of the derived parameterization can be smoothed to generate a remesh of the input mesh with smoother iso-parameter lines.

The overall process, as it is depicted in FIG. 14, starts with the input triangle mesh, the (optional) tagging of sharp edges, a resulting current triangle mesh, the parameterizations, a resulting triangle-quad quad mesh, its associated charts and the remeshing operation with smoothing.

Based on the foregoing description it should be appreciated that the embodiments of this invention maintain a mapping between an input triangle mesh, possibly having sharp tagged features, and a final polygonal mesh throughout a set of mesh connectivity operations (e.g., edge collapse, edge flip, edge split, and edge removal operations) using the set of charts. The mapping described by the set of charts is updated during every mesh connectivity operation, so that the mapping is always available. This enables the system 10 to perform any operation on any part of the mesh at any time in accordance with the constraints of the application, and further permits the logic driving execution of the set of mesh connectivity operations to make decisions independent of the parametric mapping that is being maintained. In accordance with an aspect of this invention a single chart mesh encodes the mapping of a single polygonal face of the final mesh to the region of input triangles that the final (current) face overlaps with parametrically. Evaluation of a barycentric location in a final face is accomplished by performing a point location in the corresponding chart mesh to find the corresponding input triangle, and then interpolating within that input triangle.

There are a number of applications that can benefit from the use of the embodiments of this invention. These applications include, but are not limited to, texture mapping, resampling and remeshing with subdivision connectivity, and animation.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent edge operations, smoothing techniques and the like may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method to process data comprised of a triangulated mesh representation of an object, comprising:

using a processor, establishing a continuous bijective mapping between a first triangle mesh representation of the object and a second polygonal mesh representation of the object during application of at least one mesh connectivity operation selected from a set of mesh connectivity operations;

establishing the mapping comprising computing a set of charts where an individual chart encodes a mapping of a single face of the second mesh representation to a plurality of triangles or portions thereof of the first triangle mesh representation that the single face of the second mesh representation overlaps with parametrically; and without updating an entire mapping, dynamically updating overlap portions of at least one chart of the set of charts in response to each application of the at least one mesh connectivity operation.

2. A method as in claim 1, further comprising evaluating barycentric locations of individual ones of the faces of the second mesh representation by performing a point location in a corresponding chart mesh to find a corresponding triangle of the first mesh representation, and interpolating within the corresponding triangle of the first mesh representation.

3. A method as in claim 1, where the set of connectivity operations comprises an edge collapse operation.

4. A method as in claim 1, where the set of connectivity operations comprises an edge flip operation.

5. A method as in claim 1, where the set of connectivity operations comprises an edge split operation.

6. A method as in claim 1, where an edge smoothing operation is applied to smooth the continuous bijective mapping across chart boundaries.

7. A method as in claim 1, further comprising resampling an input surface with subdivision connectivity, where parameter samples are iteratively optimized through a smoothing process, comprising sampling the parameterization at regular dyadic points, iteratively smoothing corresponding three dimensional positions, and performing a local search in parameter space to find a closest point on the surface.

8. A method as in claim 1, where establishing further comprises tagging at least one feature in the first triangle mesh representation.

9. A method as in claim 1, where each chart is associated with a chart mesh that comprises a submesh of the first triangle mesh representation corresponding to a current face and stores least one intersection parametric position per edge.

10. A method as in claim 1, where one of said set of edge connectivity operations is an edge removal operation that pairs two neighboring triangles into a quadrilateral.

11. A method as in claim 10, where after an edge removal two triangle charts are retained, and a logical quadrilateral parameterization is layered over the two retained triangle charts.

12. A method as in claim 1, further comprising mapping from the first mesh representation to the second mesh representation, or from the second mesh representation to the first mesh representation, where an input mesh representation uses barycentric locations stored in a chart mesh, where a mapping from a current mesh barycentric location $(T_c, u_c, v_c)$ uses a point location within the chart mesh, where $T_c$ is a current mesh face and $(u_c, v_c)$ are the barycentric coordinates within $T_c$ further comprising searching convex polygons to locate a convex region in the chart corresponding to an input triangle $T_f$, transforming to barycentric coordinates $(u_f, v_f)$ in the input triangle using generalized barycentric coordinates, and evaluating a position in the input mesh representation using a parametric location $(T_f, u_f, v_f)$.

13. A method as in claim 1, where an optimization of parameterization is obtained upon remeshing by repeatedly applying a smoothing stencil in order to optimize the placement of newly computed samples on the input mesh.

14. A data storage medium storing program instructions readable by a computer, execution of the program instructions causing processing of data comprised of a triangulated mesh representation of an object and comprising operations of:

establishing a continuous bijective mapping between a first triangle mesh representation of the object and a second polygonal mesh representation of the object during application of at least one mesh connectivity operation selected from a set of mesh connectivity operations;

establishing the mapping comprising computing a set of charts where an individual chart encodes a mapping of a single face of the second mesh representation to a plurality of triangles or portions thereof of the first triangle mesh representation that the single face of the second mesh representation overlaps with parametrically; and without updating an entire mapping, dynamically updating overlap portions of at least one chart of the set of charts in response to each application of the at least one mesh connectivity operation.

15. A data storage medium as in claim 14, further comprising evaluating barycentric locations of individual ones of the faces of the second mesh representation by performing a point location in a corresponding chart mesh to find a corresponding triangle of the first mesh representation, and interpolating within the corresponding triangle of the first mesh representation.

16. A data storage medium as in claim 14, where the set of connectivity operations comprises an edge collapse operation.

17. A data storage medium as in claim 14, where the set of connectivity operations comprises an edge flip operation.

18. A data storage medium as in claim 14, where the set of connectivity operations comprises an edge split operation.

19. A data storage medium as in claim 14, where an edge smoothing operation is applied to smooth the continuous bijective mapping across chart boundaries.

20. A data storage medium as in claim 14, further comprising resampling an input surface with subdivision connectivity, where parameter samples are iteratively optimized through a smoothing process, comprising sampling the parameterization at regular dyadic points, iteratively smoothing corresponding three dimensional positions, and performing a local search in parameter space to find a closest point on the surface.

21. A data storage medium as in claim 14, where establishing further comprises tagging at least one feature in the first triangle mesh representation.

22. A data storage medium as in claim 14, where each chart is associated with a chart mesh that comprises a submesh of the first triangle mesh representation corresponding to a current face and stores least one intersection parametric position per edge.

23. A data storage medium as in claim 14, where one of said set of edge connectivity operations is an edge removal operation that pairs two neighboring triangles into a quadrilateral.

24. A data storage medium as in claim 23, where after an edge removal two triangle charts are retained, and a logical quadrilateral parameterization is layered over the two retained triangle charts.

25. A data storage medium as in claim 14, further comprising mapping from the first mesh representation to the second mesh representation, or from the second mesh representation to the first mesh representation, where an input mesh representation uses barycentric locations stored in a chart mesh, where a mapping from a current mesh barycentric location $(T_c, u_c, v_c)$ uses a point location within the chart mesh, where $T_c$ is a current mesh face and $(u_c, v_c)$ are the barycentric coordinates within $T_c$ further comprising searching convex polygons to locate a convex region in the chart corresponding to an input triangle $T_f$, transforming to barycentric coordinates $(u_f, v_f,)$ in the input triangle using generalized barycentric coordinates, and evaluating a position in the input mesh representation using a parametric location $(T_f, u_f, v_f)$.

26. A data storage medium as in claim 14, where an optimization of parameterization is obtained upon remeshing by repeatedly applying a smoothing stencil in order to optimize the placement of newly computed samples on the input mesh.

* * * * *